US012794717B1

(12) United States Patent
Denisenko et al.

(10) Patent No.: US 12,794,717 B1
(45) Date of Patent: Nov. 10, 2026

(54) AUTHENTICATION TECHNIQUES FOR REMOTE SYSTEMS

(71) Applicant: Amazon Technologies, Inc., Seattle, WA (US)

(72) Inventors: Mikhail Denisenko, Broadlands, VA (US); Jaiganesh Mathaiyan, Austin, TX (US); Alexander Franklin Herron, Arlington, VA (US); Thomas Norbert Raddatz, Arlington, VA (US); Stefan Popoveniuc, Bethesda, MD (US); Wesley Thomas Spears, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 34 days.

(21) Appl. No.: 19/094,795

(22) Filed: Mar. 28, 2025

(51) Int. Cl.

| | |
|---|---|
| ***H04L 21/00*** | (2006.01) |
| ***G06F 9/54*** | (2006.01) |
| ***H04L 9/32*** | (2006.01) |

(52) U.S. Cl.
CPC ............ *H04L 9/3268* (2013.01); *G06F 9/547* (2013.01); *H04L 9/3213* (2013.01); *H04L 9/3271* (2013.01)

(58) Field of Classification Search
CPC ... H04L 9/3268; H04L 9/3213; H04L 9/3271; G06F 9/547
See application file for complete search history.

(56) References Cited

U.S. PATENT DOCUMENTS

| | | | | |
|---|---|---|---|---|
| 2010/0250497 | A1* | 9/2010 | Redlich | G06Q 10/06 707/661 |
| 2015/0134965 | A1* | 5/2015 | Morenius | H04L 63/0435 713/172 |
| 2023/0115187 | A1* | 4/2023 | Rubira Branco | G06F 11/3648 713/168 |
| 2025/0322396 | A1* | 10/2025 | Haltakov | G06Q 20/389 |

OTHER PUBLICATIONS

Ince et al., "Token-based authentication and access delegation for HW-accelerated telco cloud solution," 2022 IEEE 11th International Conference on Cloud Networking (CloudNet), Paris, France, pp. 109-117 (Year: 2022).*

* cited by examiner

*Primary Examiner* — Morshed Mehedi
(74) *Attorney, Agent, or Firm* — Eversheds Sutherland (US) LLP

(57) ABSTRACT

Systems, devices, and methods described herein provide authentication techniques for remote systems. A user at a local system is able to perform a strong authentication (e.g., using biometrics). The local system establishes a shared session (e.g., SSH tunnel) with a remote system. The user may control the remote system, for instance, via a command line interface (CLI) tool. If the user needs to use access controlled resources on the remote system, the user can obtain a short-term security token (e.g., SSO token) at the local system and securely share the token with the remote system using the shared session.

20 Claims, 7 Drawing Sheets

AUTHENTICATION TECHNIQUES FOR REMOTE SYSTEMS

BACKGROUND

In many cases, various strong authentication techniques can be leveraged for protecting local devices that a user has physical access to, but are not practical or possible for remote systems. For instance, a software developer may have in his or her possession a laptop or desktop computer for performing various development tasks within an organization. This user may, however, also wish to utilize cloud-based resources, such as virtual machines, or virtual environments that are hosted in server machines. A security challenge that may arise is that it is more difficult to perform authentication on remote systems—for instance, in many cases, a user is not able to provide biometrics, physically connect a hardware security device to the remote system, or perform various other authentication techniques that would otherwise be to ensure that the remote system is properly authenticated.

Figure 1:
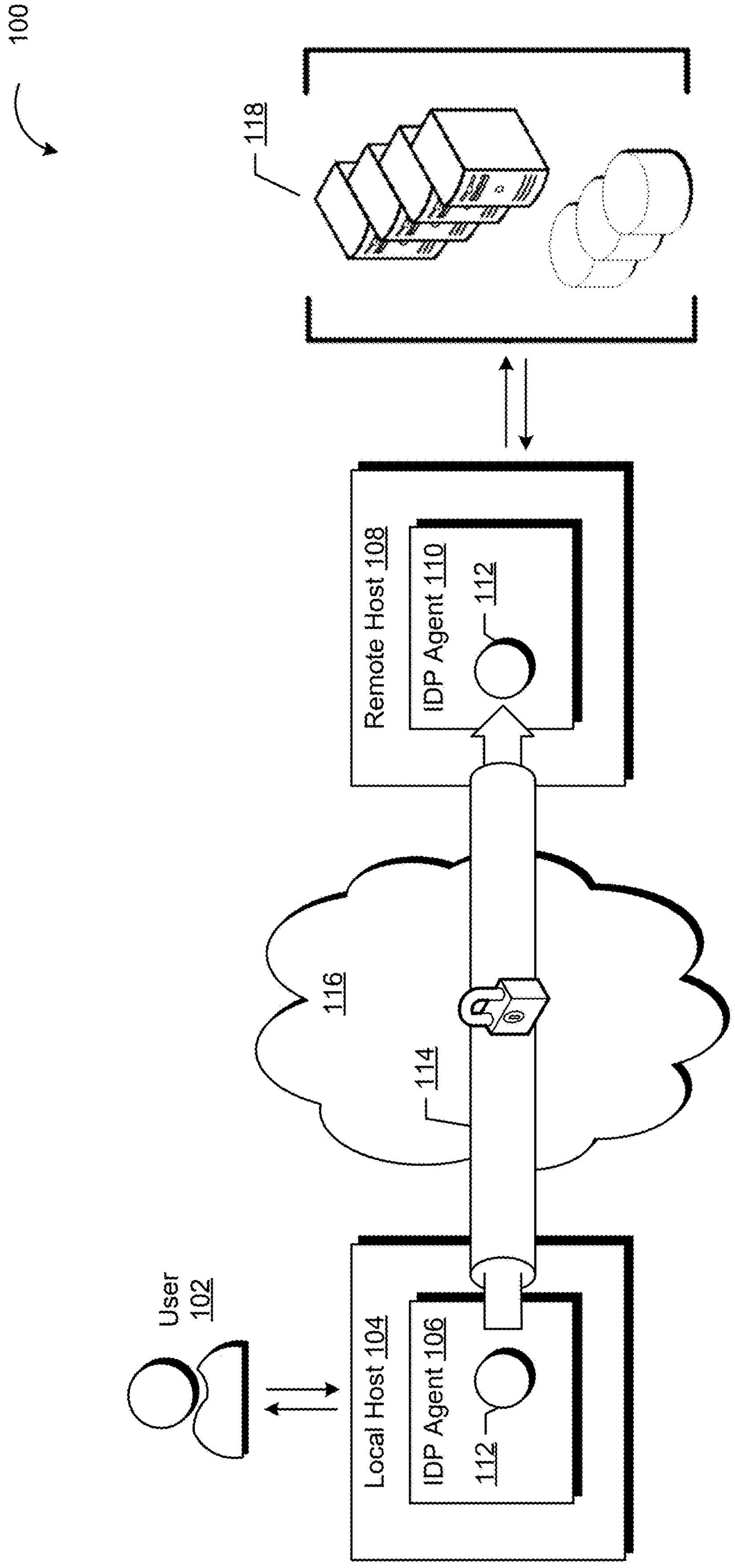
FIG. 1 illustrates a computing environment 100 in which a security token is shared from a local host to a remote host, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for authentication techniques that can be used with remote systems.

Techniques described herein may allow for sharing a user's authenticated session across devices to securely access resources protected by an identity provider. In many cases, various strong authentication techniques can be leveraged for protecting local devices that a user has physical access to, but are not practical or possible for remote systems. For instance, a software developer may have in his or her possession a laptop or desktop computer for performing various development tasks within an organization. This user may, however, also wish to utilize cloud-based resources, such as virtual machines, or virtual environments that are hosted in server machines. A security challenge that may arise is that it is more difficult to perform authentication on remote systems—for instance, in many cases, a user is not able to provide biometrics, physically connect a hardware security device to the remote system, or perform various other authentication techniques that would otherwise be to ensure that the remote system is properly authenticated.

According to at least one embodiment of the present disclosure, a local system (e.g., local host) performs a strong authentication with an identity provider to establish his or her identity. The strong authentication may involve multi-factor authentication, the use of a hardware security key to perform a cryptographic challenge-response protocol, providing biometrics, etc. This will allow the local host to obtain a SSH certificate from a certificate manager associated with the local host. The SSH certificate is provided to a remote host (e.g., remote system) to establish a SSH tunnel between a first identity provider agent running on the local host and a second identity provider agent running on the remote host. The remote host may receive the SSH certificate and verify that the local host is trusted and/or privileged for tunneling in to remote host. In various embodiments, the remote host provides a remote attestation to the local host. The local host may receive and validate the remote attestation, for instance, to check for various security patches, software update, etc. to ensure that remote host can be trusted to receive security tokens for accessing resources managed by resource provider.

The user can subsequently connect to the remote host and submit a command to use certain resources or services that are managed by a resource provider. The remote host may check whether it has a security token that would provide such access—if such a security token already exists, the remote host can utilize it directly; if not, the remote host can request a security token (e.g., SSO token) from local host. In various embodiments, local host receives the request from remote host and submits its own request to identity provider. In some embodiments, identity provider performs various authentication steps to validate the identity of local host and/or remote host. Upon determining that the local host should be allowed to access the resources, the identity provider may provide the local host a SSO token with sufficient permission to access the desired resources. The SSO token may be a short-term, timebound JSON web token (JWT). The SSO token may be transmitted from the IDP agent of the local host to the IDP agent of the remote host via the aforementioned SSH tunnel. In various embodiments, the remote host will cache the SSO token and re-use it for subsequent accesses to the same resources. Now having possession of the SSO token, the remote host may provide the SSO token to the resource provider to gain access to one or more services or resources as part of execution of a user command. The resource may be accessed according to the permissions encoded in the SSO token. In various embodiments, identity provider validates the local host user's identity and upon a positive validation, resource provider provides the remote host with access to the desired resources.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 in which a security token is shared from a local host to a remote host, in accordance with one or more example embodiments of the present disclosure.

According to at least one embodiment of the present disclosure, computing environment 100 comprises: user 102; local host 104; an identity provider agent (e.g., IDP agent 106); remote host 108; IDP agent 110; security credential 112; SSH tunnel 114; network 116; and computing resources 118. FIG. 1 depicts an illustrative, non-limiting, example of an environment, and various other embodiments comprising greater or fewer components relative to those depicts in FIG. 1 are also contemplated within the scope of this disclosure. Computing environment 100 is implemented in the context of a computing resource service provider (e.g., cloud service provider), according to at least one embodiment of the present disclosure.

In various embodiments, a user 102 refers to a user of a device such as local host 104. Local host 104 may refer to a machine (e.g., as described in connection with FIG. 7 in greater detail below) such as a laptop or personal computer. In various embodiments, user 102 has physical access to local host 104 and is capable of performing a strong authentication process using local host 104. For instance, user 102 may be able to provide biometrics to local host 104 by scanning a fingerprint. In some embodiments, user 102 connects a physical security key to local host 104 to perform authentication.

In various embodiments, user 102 can have various needs within a computing environment. For instance, user 102 may be a software developer within an organization that utilizes various resources such as remote host 108 to test or deploy code. Local host 104 may be provisioned with an identity provider agent (e.g., IDP agent 106) as depicted in FIG. 1. In various embodiments, IDP agent 106 refers to hardware, software, or a combination thereof that is provisioned on local host 104 by an organization or trusted entity. IDP agent 106 may be used to implement various functionality, including some or all of the following: performing strong authentication on the local host 104; performing multifactor authentication with a remote identity provider; obtaining certificates associated with user 102 from a trusted certificate authority (CA); requesting and obtaining short term credentials; establishing cryptographically protected communications session with remote host 108; receiving and validating remote attestations from remote host 108; providing short term credentials 112 to remote host 108 in a secure manner; and so more.

In various embodiments, IDP agent 106 of local host 104 is responsible for authenticating user 102—for instance, via a strong authentication process. In various embodiments, strong authentication refers to a method of authentication that goes beyond simple password-based authentication. In some embodiments, strong authentication is performed without requiring a password (whether in plaintext or ciphertext) to be transmitted. For instance, a strong authentication process may involve public-key cryptography to enable passwordless authentication via asymmetric encryption. According to at least one embodiment, a strong authentication process is performed according to a FIDO2-based implementation using a hardware security key or platform authenticator. In some embodiments, strong authentication involves multifactor authentication (MFA), such as two-factor authentication (2FA) that verifies something you have (e.g., a hardware token, smart card, or authenticator app) and something you are (e.g., biometrics). In various embodiments, IDP agents are deployed on local and remote hosts and are able to communicate with each other to share short-lived authentication tokens for sessions created on the local host.

Remote host 108 may refer to a computing entity that is remote from user 102. Remote host 108 may, for instance, refer to a physical or virtual machine located within a data center. In various embodiments, remote hosts refer to remote devices such as virtual development desktops and production servers, to access hosted application. In various embodiments, remote devices are corporate approved devices, unapproved devices such as bare metal or virtual instances, and so on and so forth. In various embodiments, user 102 does not have physical access to remote host 108 and is not able to perform the same strong authentication process that he or she is able to perform with local host 104. For instance, user 102 may be able to provide biometrics to local host 104 via a fingerprint scanner but is not able to physical provide such form of authentication to remote host 108. In various embodiments, certain authentication techniques that are available at local host 104 are not available at remote host 108. For instance, user 102 may be able to physically connect a hardware security key to a laptop in the user's possession, but is not able to do so with a virtual machine hosted on a remote server.

IDP agent 110 of remote host 104 may refer to hardware, software, or a combination thereof. In various embodiment, remote hosts 108 are provisioned with IDP agent 110 at launch (e.g., when a virtual machine instance is launched). IDP agent 110 may be used to facilitate the sharing of short lived authentication tokens for sessions created by local hosts, such as local host 104 depicted in FIG. 1. IDP agent 110 may be utilized to perform authentication and/or authorization of remote host 108 to access computing resources 118, which may be cloud-based resources managed by a cloud service provider. In various embodiments, IDP agent 110 is responsible for providing remote attestations to the local host so that the local host can determine whether remote host 108 is trustworthy based on its hardware and/or software configuration.

In various embodiments, security token 112 refers to a timebound credential. Security token 112 may be implemented as a JSON web token (JWT). In various embodiments, IDP agents enable the sharing of OIDC (OpenID Connect) short-lived authentication tokens for a session created by local host 104. In various embodiments, local host 104 requests a resource-based short-term SSO (Single Sign-On) token for resources on an as-needed basis. The SSO token may be provided by an identity provider after verifying device claims of both the hosts and grants the ID token only if both are valid claims by validating against a repository of approved devices. In the case that the remote device is an unapproved device (e.g., when it is an ad hoc cloud instance), user 102 can be prompted to provide approval for the validity of the device.

In various embodiments, security token 112 encodes limited credentials to access specific resources. For instance, user 102 may have sufficient privileges to access a wide range of resources within a cloud-based environment but security token 112 encodes sufficient rights to access only one or only some of those resources. In some embodiments, security token 112 encodes sufficient rights to access one or more resources of a specific resource provider. For instance, security token 112 may be usable to access a first resource of a first resource provider, but is unable to access any resources of a second resource provider. If, for instance, user 102 wishes to provide remote host 108 with access to a first resource of a first resource provider and a second resource of a second resource provider, the user 102 may obtain two separate security tokens—a first security token to access the first resource and a second security token to access the second resource. These security tokens may be managed separately from each other or may be accessed jointly—for instance, they could share the same expiration time, but such need not always be the case.

SSH tunnel 114 may refer to a cryptographically protected communications session that is used to provide secure communications between IDP agent 106 of local host 104 and IDP agent 110 of remote host 108. In various embodiments, the SSH tunnel 114 is established between local host 104 and remote host 108 according to techniques described in greater detail below in connection with FIG. 2 A SSH tunnel connection may be used by IDP agent 106 of local host 104 to securely transmit security token 112 to IDP agent 110 of remote host 108.

Accordingly, it may be the case that an organization may wish to utilize strong authentication techniques (e.g., biometric-based authentication) but not have the ability to perform all forms of authentication across all systems that a user may utilize. In at least one embodiment of the present disclosure, user 102 performs a strong authentication process at local host 104 and IDP agents on the local host and remote host coordinate the distribution of short term security credential 112. For instance, IDP agent 106 and IDP agent 110 may first establish a SSH tunnel 114 and then use it to securely transfer security credential 112 from IDP agent 106 of local host 104 to IDP agent 110 of remote host 108. IDP agent 110 of remote host 108 may receive security credential 112 and then use security credential 112 to access various computing resources 118. For instance, computing resources 118 may refer to one or more cloud-based computing resources that user 102 has or can gain access to. By obtaining security credential 112 from IDP agent 106 of local host 104, remote host 108 is not required to perform a separate authentication process and can rely on the strong authentication process performed at local host 104 to ensure proper security measures are being employed to protect sensitive data and resources.

In various embodiments, user 102 is able to submit commands to remote host 108 via a command line interface (CLI), browser command, or other mechanisms by which user 102 can interact with a remote system. In various embodiments, a user command is transmitted from local host 104 to remote host 108. IDP agent 110 of remote host 108, in various embodiment, determines that the user command requires access to certain resource (e.g., one of the computing resources 118 depicted in FIG. 1). As part of security best practices, access to resources may be denied by default. At a time t1, IDP agent 110 may determine that the remote host 108, not yet having security credential 112, lacks sufficient permissions to access the computing resources 118. Upon making this determination and at time t2>t1, the IDP agent 110 of remote host 108 may submit a request to IDP agent 106 of local host 104 to obtain security credential 112. In some embodiments, remote host 108 provides a remote attestation to IDP agent 106 of local host 104. In various embodiments, the remote attestation is provided over SSH tunnel 114. In various embodiments, a remote attestation comprises a hardware and/or software configuration of the remote host 108 and is cryptographically verifiable using a public key issued by a certificate authority that the local host 104 trusts. IDP agent 106 of local host 104 may receive, at time t3>t2, the remote attestation and validate it. In response to determining that the remote attestation is valid, security credential 112 may be provided to IDP agent 110 of remote host 108 via SSH tunnel 114. In some cases, IDP agent 106 will obtain security credential 112 from an identity provider service. Regardless, security credential 112 may be provided to IDP agent 110 and then used by remote host 108 to access computing resource 118.

In various embodiments, commands or instructions may be transmitted or received over network 116 using a transmission medium via the network interface device/transceiver utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, a network interface device/transceiver may include one or more physical jacks (e.g., Ethernet, coaxial, or phone jacks) or one or more antennas to connect to network 116. In an example, a network interface device/transceiver may include a plurality of antennas to wirelessly communicate using at least one of single-input multiple-output (SIMO), multiple-input multiple-output (MIMO), or multiple-input single-output (MISO) techniques. The term “transmission medium” shall be taken to include any intangible medium that is capable of storing, encoding, or carrying instructions for execution by a machine (e.g., local host 104 and/or remote host 108) and includes digital or analog communications signals or other intangible media to facilitate communication of such software. In various embodiments, a cryptographically protected communications session (e.g., SSH tunnel 114) provides for confidential communications between local host 104 and remote host 108.

Figure 2:
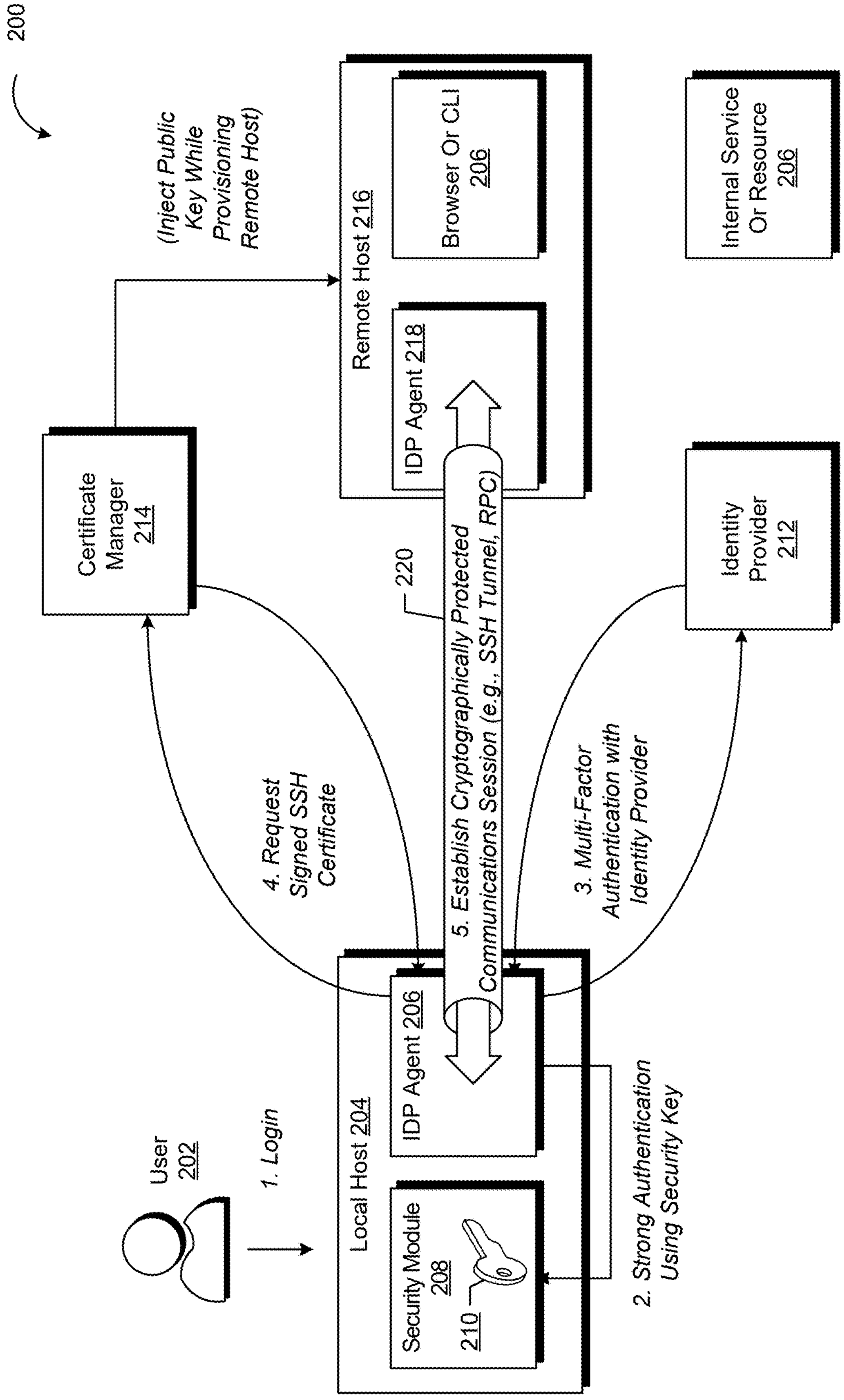
FIG. 2 illustrates a computing environment 200 for establishing a secure session (e.g., SSH tunnel) between a local host and remote host, in accordance with one or more example embodiments of the present disclosure.

FIG. 2 illustrates a computing environment 200 for establishing a secure session (e.g., SSH tunnel) between a local host and remote host, in accordance with one or more example embodiments of the present disclosure.

According to at least one embodiment of the present disclosure, computing environment 200 comprises: user 202; local host 204; IDP agent 206; security module 208; cryptographic key 210; identity provider 212; certificate manager 214; remote host 216; IDP agent 218; and cryptographically protected communications session 220. FIG. 2 depicts an illustrative, non-limiting, example of an environment, and various other embodiments comprising greater or fewer components relative to those depicts in FIG. 2 are also contemplated within the scope of this disclosure. Computing environment 200 is implemented in the context of a computing resource service provider (e.g., cloud service provider), according to at least one embodiment of the present disclosure. Various teachings provided in connection with FIG. 1 may apply to FIG. 2.

In various embodiments, user 202 initiates a login for gaining access to local host 204. Local host 204 may be a device such as a laptop or personal computer that user 202 has physical access to. Local host 204 may have various hardware and/or software capabilities. Local host 204 may comprise a security module 208 for securely storing a cryptographic key 210. The cryptographic key 210 may be a private key associated with an identity of the user 202. In various embodiments, security module 208 refers to specialized hardware of the local host 204. For instance, security module 208 may be a trusted platform module (TPM) chip that is embedded into the motherboard of local host 204.

Security module 208 may be characterized by providing hardware level security of sensitive data stored therein, such as cryptographic key 210. Cryptographic material (e.g., private keys) and other information stored in a security module 208 may be said to be programmatically unexportable if there is no legitimate way to programmatically cause (e.g., through an interface of the security module) the security module to provide the information. Information, such as customer keys or other sensitive data, may be maintained such that there is no request mechanism (e.g., application programming interface (API) call) for causing hardware, with access to the information in plaintext form, to reveal the information in plaintext form. As an example, the security module may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form. As a result, absent extraordinary computational effort, a device lacking access to cryptographic material securely stored within a security module is unable to perform various cryptographic operations such as decrypting ciphertexts, generating digital signatures or authentication tags, etc. In some embodiments, security module 208 refers to a hardware security key that provides for phishing-resistant authentication across devices. The hardware security key may be electronically connected to security module 208 via a USB port or other suitable connection mechanism. In some embodiments, the hardware security key is wireless connected to local host 204.

In various embodiments, a SSH session is created when the user 202 logs in to local host 204. In various embodiments, a strong authentication is performed, which may involve using cryptographic key 210 as a security key. For instance, in some embodiments, the strong authentication involves the user 202 providing biometric verification his or her identity. In some embodiments, when user 202 logs in, local host 204, the device prompts the user to press a button on a hardware security key, which then generates a signed response (e.g., digital signature generated using cryptographic key 210 to identity provider 212, and identity provider 212 validates the identity of the user. In various embodiments, a multi-factor authentication is performed with identity provider 212 to validate the user's identity. For instance, the multi-factor authentication may involve two or more authentication factors. Authentication factors may have varying degrees of assurances and practical usability. Examples of authentication factors that may be employed include some or all of: security questions; one-time passwords or codes; app-generated codes (e.g., in the form of a time-based one-time password); specialized authentication apps; physical authentication keys; biometrics; cryptographic challenge-response protocols; and more. Two or more authentication factors may be used by identity provider 212 to verify the identity of the user 202. In various embodiments, IDP agent 206 perform a multi-factor authentication with IDP agent 206. In some embodiments, another component of local host 204 performs the authentication or a portion thereof. IDP agent 206 of local host 204 may obtain a security token (e.g., credential) upon completing an authentication process with identity provider 212.

Returning to FIG. 2, once the login is complete, IDP agent 206 may request a signed certificate from certificate manager 214. In various embodiments, the certificate is a signed SSH certificate. The certificate may include a public key associated with the identity of the user 202 and is signed by a root authority that is trusted by the local host 204 and remote host 216. In various embodiments, certificate manager 214 refers to a trusted entity within the computing environment 200 that provides digital certificates that are cryptographically verifiable for authenticity and/or integrity by local host 204 and/or remote host 216. Certificate manager 214 may also inject public key material into remote host 216 when remote host 216 is provisioned. This public key may be used as part of establishing the SSH tunnel between local host 204 and remote host 216.

IDP agent 206 of local host 204 and IDP agent 218 of remote host 216 may perform a certificate-based handshake to establish a secure communications session. In various embodiments, this involves certificate manager 214 providing local host 204 with a certificate and local host 204 presents the certificate to remote host 216. Remote host 216 is configured to trust the certificate (e.g., because it is signed by a trusted certificate authority or root authority) and remote host 216 therefore accepts the certificate. In various embodiments, certificate manager 214 is implemented as a SSH certificate manager service that manages SSH public key based authentication to the remote host 216. In various embodiments, this service will sign and issue a certificate to a requesting agent (e.g., IDP agent), deploy the certificate authority public key using SSH certificate manager to the remote device. In various embodiments, OpenSSH will use a public key authentication mechanism to verify the certificate and allow the SSH connection. Enforcement of additional checks for authentication assurance level (AAL) and identity assurance level (IAL) may be implemented.

In some embodiments, the local host 204 will request a remote attestation from the remote host 216 prior to establishing the cryptographically protected communications session 220. In various embodiments, the remote attestation provides cryptographically verifiable assurances of the hardware and/or software configuration of the remote host 216. The remote attestation can be used to validate that the remote host 216 is an approved device, or prompt the user for additional approval if the device is not already in the approved list of devices (e.g., due to being an ad hoc cloud instance). In some embodiments, the remote attestation can be inspected to ensure that the remote host 216 is running the latest version of an operating system or other software, check that certain security patches are applied, or otherwise allow IDP agent 206 of local host 204 to evaluate the posture of remote host 216 to determine whether to establish a SSH tunnel with IDP agent 218 of remote host 216, which can eventually be used by remote host 216 to request short term credentials from the local host 204.

In various embodiments, cryptographically protected communications session 220 provides cryptographically verifiable assurances of confidentiality, authenticity, and/or integrity. In various embodiments, confidentiality refers to assurances that only authorized entity are able to determine the contents transferred via such communications channels, authenticity refer to assurances that a message was created by a party purporting to be the author of the message and integrity refers to assurances that a received message was not modified either intentionally (e.g., by a malicious party) or unintentionally (e.g., as a result of signal loss during transmission) from its original form when the message was transmitted. In some embodiments, cryptographically protected communications session 220 is implemented using an encrypted inter-process communication (IPC) mechanism such as a SSH tunnel. In some embodiments, cryptographically protected communications session 220 is implemented using an RPC-based mechanism. For instance, SSH connections may be established over RPC by having a RPC agent on local host 204 send a RPC request to an RPC service. The RPC service may refer to a proxy or intermediate system that is capable of establishing a SSH session with a target (e.g., remote host 216). In various embodiments, the RPC service is implemented as a daemon or specialized gateway and acts as a bridge between local host 204 and remote host 216. In various embodiments, local host 204 transmits SSH-related messages (e.g., a message including a security token) to the RPC service, which decodes the message and/or forwards them to the remote host 216.

Figure 3:
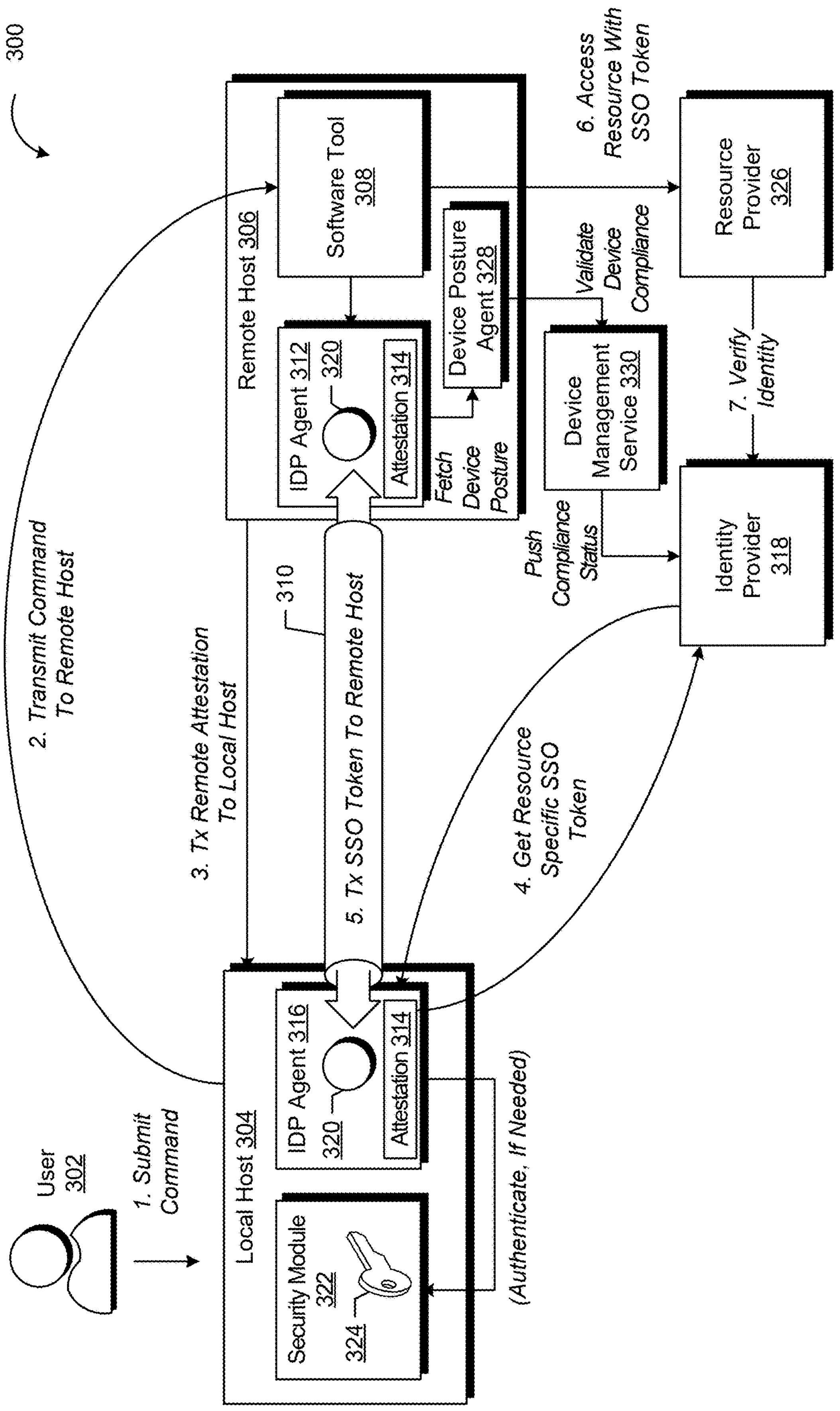
FIG. 3 illustrates a computing environment 300 for sharing an authentication token over secure session (e.g., SSH tunnel), in accordance with one or more example embodiments of the present disclosure.

FIG. 3 illustrates a computing environment 300 for sharing an authentication token over secure session (e.g., SSH tunnel), in accordance with one or more example embodiments of the present disclosure.

According to at least one embodiment of the present disclosure, computing environment 300 comprises: user 302; local host 304; remote host 306; software tool 308 (e.g., browser or CLI); cryptographically protected communications session 310; IDP agent 312 of remote host; attestation 314; IDP agent 316 of local host; identity provider 318; security token 320; security module 322; cryptographic key 324; resource provider 326; device posture agent 328; and device management service 330. FIG. 3 depicts an illustrative, non-limiting, example of an environment, and various other embodiments comprising greater or fewer components relative to those depicts in FIG. 3 are also contemplated within the scope of this disclosure. Computing environment 300 is implemented in the context of a computing resource service provider (e.g., cloud service provider), according to at least one embodiment of the present disclosure. Various teachings provided in connection with FIG. 1 and/or FIG. 2 may apply to FIG. 3. For instance, cryptographically protected communications session 310 (e.g., a SSH tunnel) between local host 304 and remote host 306 can be established according to techniques described in connection with FIG. 2.

In various embodiments, local host 304 and remote host 306 are provisioned with identity provider (IDP) agents. The IDP agents may be configured to enable sharing of a security token, which may be in the form of a OIDC (OpenID Connect) short-lived authentication token for a session created on the local host. A cryptographically protected communications channel 310 may be established between local host 304 and remote host 306 to facilitate secure communications to/from the systems. When a user initiates a SSH connection to the remote host, a tunnel may be used with remote port forwarding. In some embodiments, a RPC agent on local host 304 establishes a SSH connection with a RPC server to facilitate inter-process communications with remote host 306. In various embodiments, to address SSRF (server-side request forgery) concerns, a Unix domain socket may be used instead of a port to enable IPC (inter-process communication) between the local host 304 and remote host 306.

In various embodiments, user 302 can submit a command to access a resource. For instance, local host 304 may be located on a public cloud or Internet whereas the remote host 308 is located within a corporate network with various resources managed by resource provider 326. In various embodiments, user 302 submits a command to local host 304 (e.g., via a software tool or program) and the command is transmitted to remote host 306, for instance, via a network connection. In some embodiments, the command is transmitted via SSH tunnel 310 but such need not be the case. Remote host 306 may receive the user command at software tool 308. In various embodiments, software tool 308 is a command line interface (CLI) tool or browser running on remote host 306. Software tool 308 may determine that the command involves accessing one or more computing resources managed by resource provider 326. Software tool 308 may submit an application programming interface (API) call to IDP agent 312 to authorize access to the resources for executing the user command.

In various embodiments, IDP agent 312 receives an API call from software tool 308. The API call may involve the software tool 308 requesting a security token that encodes sufficient permission to access one or more computing resources managed by resource provider 326 that are needed for execution of the user command. In at least one embodiment, IDP agent 312 checks whether it has access to a security token that provides such permissions. In some cases, IDP agent 312 will already have access to a short-lived security token that it can directly provide to software tool 308 for accessing the resources. However, in other cases, the remote agent will not already have a security token and will need to perform a user authentication over the SSH tunnel.

According to at least one embodiment of the present disclosure, IDP agent 312 will determine a remote attestation (e.g., attestation 314) that comprises a hardware and/or software configuration of the remote host 306 and is cryptographically verifiable using a public key issued by a certificate authority that the local host 304 trusts. In various embodiments, the attestation 314 is produced within a protected execution environment (e.g., enclave) of the remote host 306 indicating the software and/or hardware configuration of remote host 306, its capabilities (e.g., with respect to supported security protocols, cipher suites, and others), etc. In various embodiments, the attestation 314 is cryptographically generated in a tamper-resistant manner that provides for cryptographically verifiable assurances of integrity and authenticity. IDP agent 312 of remote host 306 may transmit the attestation 314 to IDP agent 316 of local host 304 via SSH tunnel 310.

In various embodiments, IDP agent 316 of local host 304 receives attestation 314 and validates the attestation 314 by sending a validation request with the remote attestation 314 to identity provider 318. In various embodiments, validation of the attestation 314 involves determining that the attestation 314 originated from remote host 306, that the attestation has not been tampered with in any way, and that the remote host 306 is configured in a manner that is suitable for SSO token sharing. For instance, if the remote host 306 is running an older version of an operating system or application (e.g., browser), it may be deemed to be insecure. If the remote host 306 lacks a recent security patch, it may be deemed to be insecure. In some embodiments, device management service 330 validates device compliance of remote host 306 and pushes the host's compliance status to identity provider 318. The compliance status may provide a positive indication or negative indication of the remote host's trustworthiness. Regardless of the manner performed, identity provider 318 may determine that the remote host 306 is or is not worthy of token sharing. If identity provider 318 determines that the remote host 306 is trustworthy, then identity provider 318 may vend a security token 320 to IDP agent 316 of local host 304. In some embodiments, the identity provider 318 sends an indication to local host 304 that remote host 306 is trustworthy. In various embodiment, security token 320 is a short-lived SSO token that is obtained from identity provider 318. In some embodiments, when the user 302 is unauthenticated, the local host 304 will perform a strong authentication (e.g., using a cryptographic key 322 security stored within security module 320) and identity provider 318 that allows the local host to access the specific resources needed for execution of the user command referenced in Step 1. In various embodiments, the identity provider verifies the device claims of both the local host 304 and remote host 306 and grants the ID token only if both are valid claims by validating against a repository of approved devices. In some cases, the remote host is an unapproved device (e.g., an ad hoc cloud instance) but nevertheless can be approved manually by the user 302 (e.g., using MFA or other strong authentication).

Security token 320 may be transmitted or otherwise provided by IDP agent 316 of local host 304 to IDP agent 312 of remote host 306 via SSH tunnel 310. The security token 320 can then be provided by IDP agent 312 to software tool 308, which will then be able to provide the security token 320 to resource provider 326. In various embodiments, the resource provider uses security token 320 to verify the identity of remote host 306 as being associated with user 302. Identity provider 318 may be used to validate the security token 320 and verify the user's identity. In some embodiments, the user 302 receives a notification or authentication to allow for the remote host 306 to gain access to resources within resource provider 326.

In various embodiments, device posture agent 328 refers to hardware, software, or a combination thereof and is a component of remote host 306. In various embodiments, device posture agent 328 fetches or otherwise obtains device posture information for the remote host 306 from IDP agent 312. In various embodiments, the device posture information includes hardware and/or software configuration information of the remote host 306. In various embodiments, device posture agent 326 sends device posture information to device management service 330. In various embodiments, device management service 330 is a service of a cloud service environment that validates device compliance. In various embodiments, device management service 330 periodically validates the device compliance with a unique device ID. The device ID may be associated to remote host 306. IN various embodiments, device compliance status is pushed to the identity provider 318.

Figure 4:
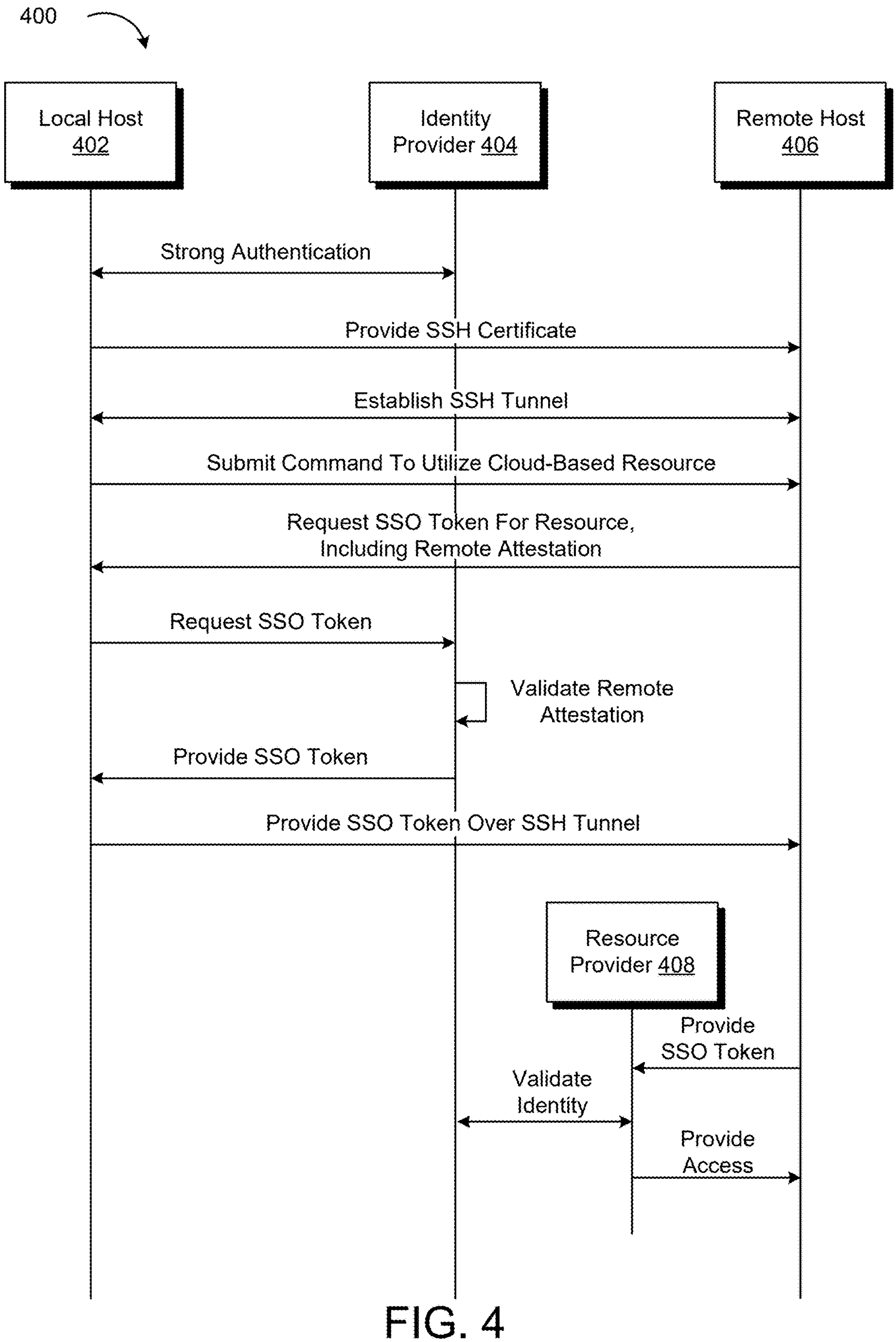
FIG. 4 illustrates a diagram 400 for facilitating secure single sign for remote systems, in accordance with one or more example embodiments of the present disclosure.

FIG. 4 illustrates a diagram 400 for facilitating secure single sign for remote systems, in accordance with one or more example embodiments of the present disclosure.

According to at least one embodiment of the present disclosure, diagram 400 comprises: local host 402; identity provider 404; remote host 406; and resource provider 408. FIG. 4 depicts an illustrative, non-limiting, embodiment, and various other embodiments comprising greater or fewer components relative to those depicts in FIG. 4 are also contemplated within the scope of this disclosure. Diagram 400 is implemented in the context of a computing resource service provider (e.g., cloud service provider), according to at least one embodiment of the present disclosure. Various teachings provided in connection with some or all of FIG. 1 thru FIG. 3 may apply to FIG. 4.

In various embodiments, local host 402 performs a strong authentication with identity provider 404. The strong authentication may involve multi-factor authentication, the use of a hardware security key to perform a cryptographic challenge-response protocol, providing biometrics, etc. In various embodiments the strong authentication is successful and the user of local host 402 is able to obtain a SSH certificate from a certificate manager. The certificate may be created using a SSH certificate signing key that is periodically rotated. In various embodiments, a SSH certificate associated with the local host 402 is provided to remote host 406 as part of a request to establish a SSH tunnel. The remote host 406 may receive the SSH certificate and verify that the local host 402 is trusted and/or privileged for tunneling in to remote host 406.

In various embodiments, local host 402 and remote host 406 establish a SSH tunnel or another suitable communications session. Local host 402 may submit a command to remote host 406. Remote host 406 may need authorization to access one or more resources managed by resource provider 408 as part of executing the user command. Remote host 406 may check whether it has a security token that would provide such access—if such a security token already exists, remote host 406 can utilize it directly; if not, the remote host 406 can request a security token (e.g., SSO token) from local host 402. In various embodiments, the remote host 406 generates, obtains, or otherwise determines a remote attestation. The remote attestation may be digitally signed such that it is tamper proof. The remote attestation may provide information regarding the hardware and/or software configuration of the remote host 406 and is cryptographically verifiable using a public key issued by a trusted certificate authority. In various embodiments, local host 402 receives the request (including remote attestation) from remote host 406 and submits its own request to identity provider 404, including the remote attestation. In some embodiments, identity provider 404 performs various authentication steps to validate the identity of local host 402 and/or remote host 406. The identity provider 404 may receive and validate the remote attestation, for instance, to determine that the remote host 406 has a configuration of software and/or hardware that is at least as secure as local host 402. For instance, identity provider 404 may check for various security patches, software update, etc. to ensure that remote host 406 can be trusted to receive security tokens for accessing resources managed by resource provider 408. Identity provider 404 may provide local host a SSO token with sufficient permission to access the desired resources. The SSO token may be transmitted from local host 402 to remote host 406 via the aforementioned SSH tunnel. In various embodiments, remote host 406 will cache the SSO token and re-use it for subsequent accesses to the same resources. For subsequent resource access on remote host 406, the same SSH tunnel can be used to request a short-lived SSO token each time the current SSO token expires or for additional SSO tokens that can be used to access other resources. In various embodiments, the user is not required to re-authenticate for subsequent requests for the same SSO token until the session time expires.

In various embodiments, remote host 406 provides SSO token to resource provider 408 as part of execution of a user command. The resource may be accessed according to the permissions encoded in the SSO token. In various embodiments, identity provider 404 validates the local host user's identity and upon a positive validation, resource provider 408 provides the remote host 406 with access to the desired resources.

Figure 5:
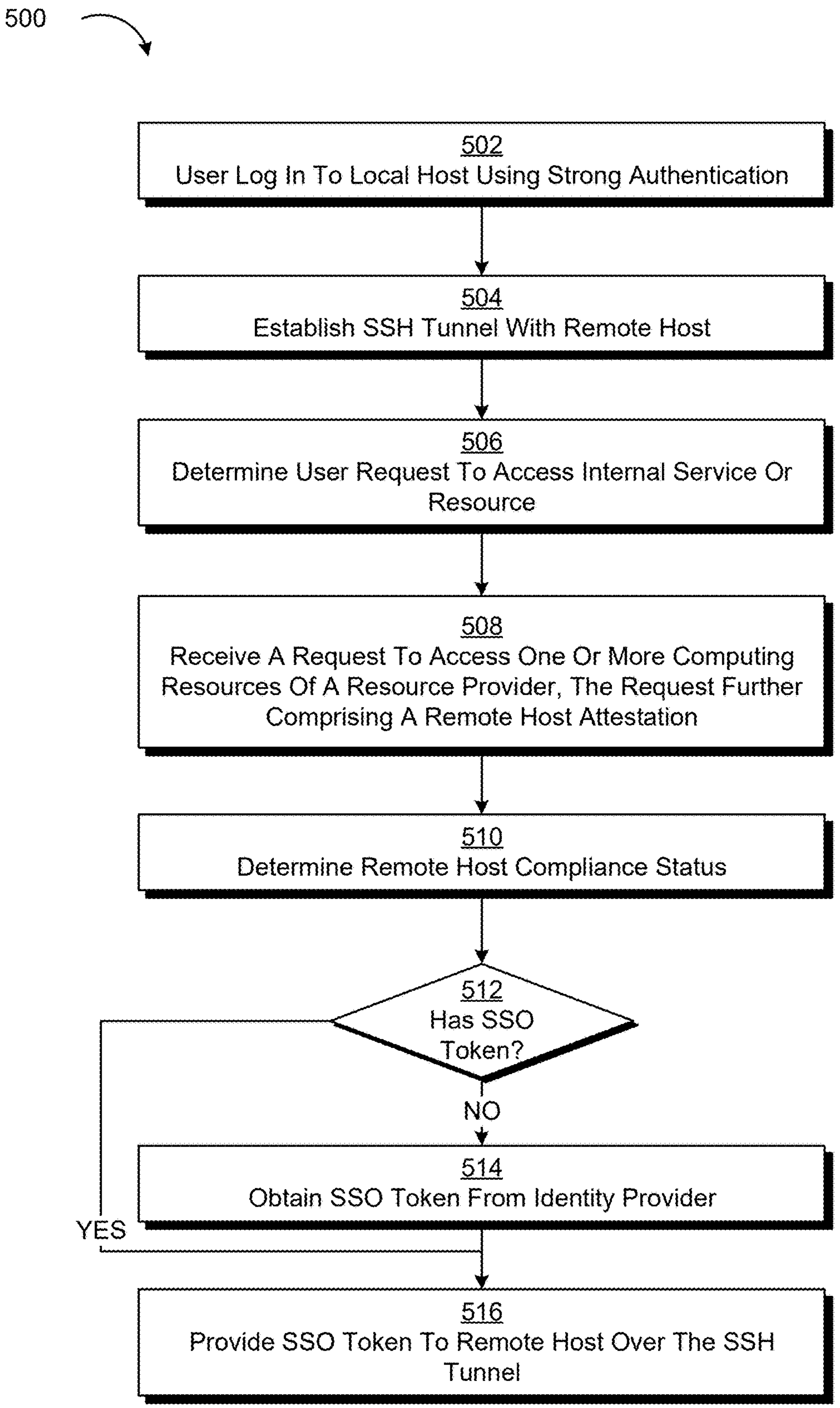
FIG. 5 shows an illustrative example of a process 500 for a local host to share a secure token with a remote host, in accordance with one or more example embodiments of the present disclosure.

FIG. 5 shows an illustrative example of a process 500 for a local host to share a secure token with a remote host, in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In various embodiments, a system comprises one or more processors and memory storing executable instructions that, as a result of execution by the one or more processors, cause the system to perform some or all of the steps of process 500. Process 500 may be implemented in the context of various systems and methods described elsewhere in this disclosure, such as those discussed in connection with FIGS. 1-4 and 7. In at least one embodiment, process 500 or a portion thereof is implemented by a local host, for instance, as depicted in FIG. 1.

Process 500 comprises a step 502 for user to log in to local host using strong authentication, according to at least one embodiment of the present disclosure. In various embodiments, a strong authentication process is performed according to a FIDO2-based implementation using a hardware security key or platform authenticator. In some embodiments, strong authentication involves multifactor authentication (MFA), such as two-factor authentication (2FA) that verifies something you have (e.g., a hardware token, smart card, or authenticator app) and something you are (e.g., biometrics).

Process 500 comprises a step 504 to establish a SSH tunnel with a remote host, according to at least one embodiment of the present disclosure. In various embodiments, IDP agents are deployed on local and remote hosts and are able to communicate with each other to share short-lived authentication tokens for sessions created on the local host. The local host performing process 500 may send a certificate (e.g., SSH certificate) with a public key to remote host and a cryptographically protected communications session (e.g., SSH tunnel) is established using asymmetric cryptography. In some embodiments, the remote host will provide a remote attestation and the local host will validate the remote host's security posture as a prerequisite to establishing the SSH tunnel.

Process 500 comprises a step 506 to determine user request to access internal service or resource, according to at least one embodiment of the present disclosure. In various embodiments, the local host sends a command to a CLI tool or browser of the remote host, the command needing access to access controlled resources within a cloud environment.

Process 500 comprises a step 508 to receive a request to access one or more resources of a resource provider, the request further comprising a remote host attestation. In some embodiments, the system will validate the remote host attestation by providing the remote attestation to a cloud-based identity provider and receiving, from the cloud-based identity provider, compliance status information of the remote host. In some embodiments, the remote attestation is inspected to ensure that the remote host is running the latest version of an operating system or other software, check that certain security patches are applied, or otherwise allow an IDP agent of the local host to evaluate the posture of remote host to determine whether to provide a SSO token to the remote host which would allow the remote host to access certain resources (e.g., sensitive data).

Process 500 comprises a step 510 to determine remote host compliance status. In various embodiments, process 500 proceeds to step 512 if the remote host is determined to be compliant. However, if the remote host is deemed to be untrustworthy for any reason—for instance, if a cloud-based identity provider indicates that the device's hardware and/or software configuration is non-compliant, the process 500 may terminate without providing security token to the remote host.

Process 500 comprises a step 512 to determine whether the local host has a valid SSO token, according to at least one embodiment of the present disclosure. In some embodiments, the local host will have previously obtained a SSO token for the resource or internal service that was requested in step 506. In such cases, process 500 can proceed directly to step 516. However, in cases where the local host does not have a valid SSO token (e.g., due to expiration), process 500 proceeds to step 514.

Process 500 comprises a step 514 to obtain SSO token from identity provider, according to at least one embodiment of the present disclosure. In various embodiments, the identity provider performs an authentication process with the local host, for instance, requiring a multi-factor authentication to validate the identity of the user. A short-term security token may be provided to the local host, for instance, in the form of a timebound JSON web token (JWT).

Process 500 comprises a step 516 to provide the SSO token to the remote host over the SSH tunnel, according to at least one embodiment of the present disclosure. The SSO token may be provided via the SSH tunnel to provide for confidentiality, authenticity, integrity, and/or nonrepudiation. In various embodiments, the remote host may receive the SSO token and use it to access the internal service and/or resource referenced in step 506 and fulfill the user request.

Figure 6:
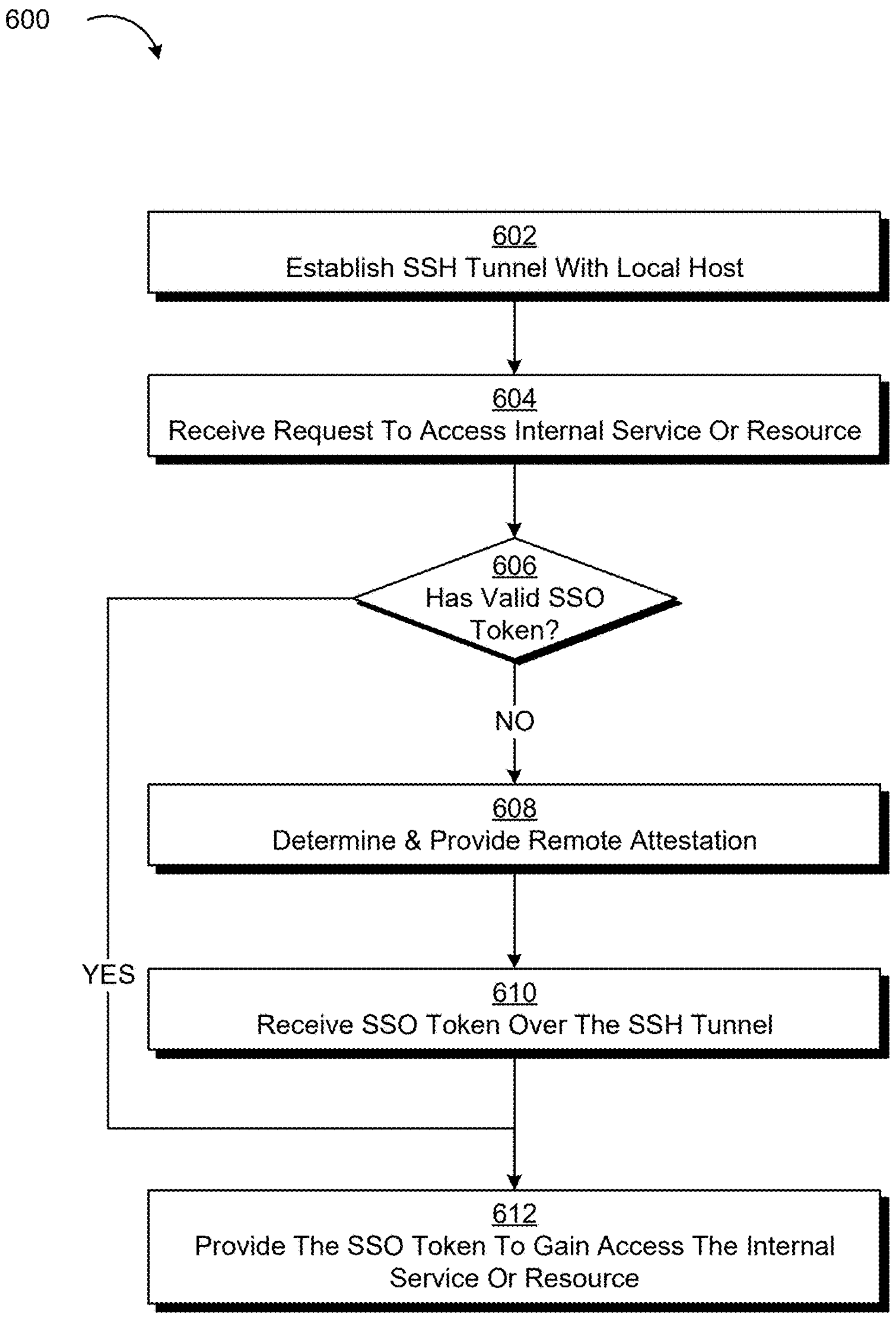
FIG. 6 shows an illustrative example of a process 600 for a remote host to utilize a shared secure token, in accordance with one or more example embodiments of the present disclosure.

FIG. 6 shows an illustrative example of a process 600 for a remote host to utilize a shared secure token, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In various embodiments, a system comprises one or more processors and memory storing executable instructions that, as a result of execution by the one or more processors, cause the system to perform some or all of the steps of process 600. Process 600 may be implemented in the context of various systems and methods described elsewhere in this disclosure, such as those discussed in connection with FIGS. 1-5 and 7. In at least one embodiment, process 600 or a portion thereof is implemented by a remote host (e.g., within the context of a computing resource service provider).

Process 600 comprises a step 602 to establish a SSH tunnel with a local host, according to at least one embodiment of the present disclosure. The SSH tunnel—or other cryptographically protected communications session—may be established as described above in connection with FIG. 5

Process 600 comprises a step 604 to receive request to access an internal service or resource, according to at least one embodiment of the present disclosure. In various embodiments, the request is received in the form of a command at a tool (e.g., CLI tool), web browser, or other software of the remote host.

Process 600 comprises a step 606 to determine whether the system has a valid SSO token for accessing the internal service or resource, according to at least one embodiment of the present disclosure. In some embodiments, the remote host has a valid SSO token to access the internal service or resource already, and can proceed directly to step 610. However, if the system does not have a valid SSO token (e.g., expired token) the process 600 proceeds to step 608.

Process 600 comprises a step 608 to determine and provide a remote attestation, according to at least one embodiment of the present disclosure. In some embodiments, the remote attestation comprises a hardware and/or software configuration of the remote host and is cryptographically verifiable using a public key issued by a certificate authority that the local host trusts. In some embodiments, a remote attestation is established once per session (e.g., when SSH tunnel is established). In some embodiments, a remote attestation is provided on a periodic basis or on an as needed basis, as determined by the local host. The remote attestation may be produced by an enclave of the remote host having cryptographic material (e.g., private key) that is used to sign the attestation.

Process 600 comprises a step 610 to receive SSO token over the SSH tunnel, according to at least one embodiment of the present disclosure. In various embodiments, the SSH tunnel is encrypted so that parties other than the remote host and local host are not able to inspect or intercept the SSO token during transmission. In some embodiments, the SSO token is received by an identity provider agent of the remote host and is cached so that subsequent requests to access the same internal service or resource can re-use the token instead of requesting for the token from the local host again.

Process 600 comprises a step 612 to provide the SSO token to gain access to the internal service or resource, according to at least one embodiment of the present disclosure. In some embodiments, the SSO token is presented to a resource provider to gain access to the internal service or resource. Accordingly, techniques described herein allow for remote host to gain access to various resources backed by a SSO token in a passwordless manner—the user is never required to provide their password to the remote host directly, thereby avoiding potential security risks involved in the password being intercepted or monitored in transit or at rest, if the remote host is compromised.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 7:
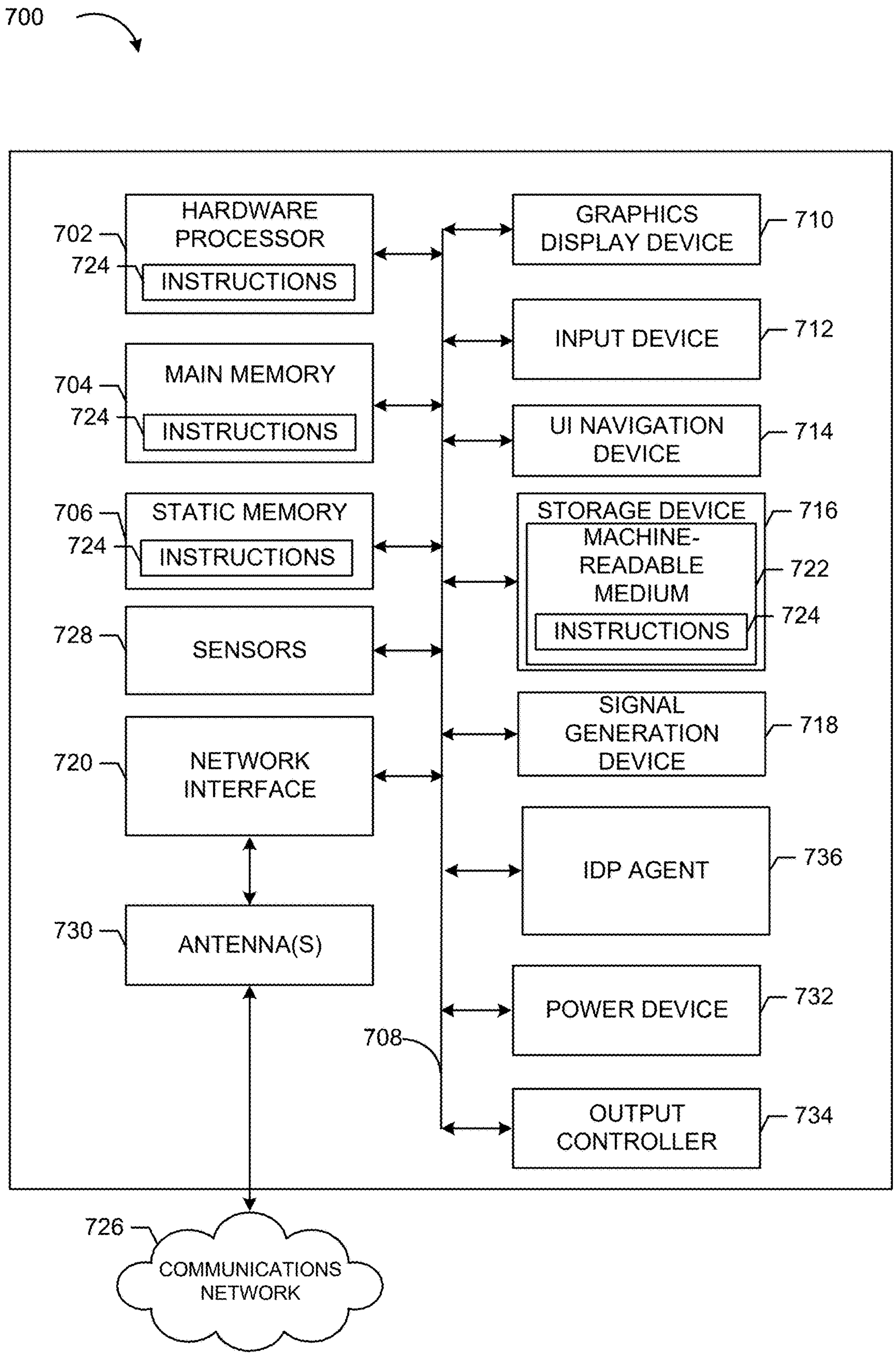
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., implemented in whole or in part in the context of embodiments described in connection with other figures. In some embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include any combination of the illustrated components. For example, the machine 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (e.g., drive unit) 716, a signal generation device 718, and a network interface device/transceiver 720 coupled to antenna(s) 730. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

In various embodiments, IDP agent 736 refers to hardware, software, or a combination thereof that facilitates authentication techniques described in connection with some or all of FIG. 1 thru FIG. 6. For instance, IDP agents may be implemented in the context of a local host machine and/or a remote host machine.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that causes the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Articles such as "a" or "an" should generally be interpreted to include one or more described items, unless otherwise explicitly stated or contradicted by context. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Unless explicitly stated or otherwise contradicted by context, when a process is collectively performed by two or more systems, the systems involved in performing the process are not each required to be individually capable of performing all process steps. For example, if a method recites steps {A, B, C} that is collectively performed by a set of devices, a first device can comprise first memory storing instructions to perform {A} but not {B, C}, a second device can comprise second memory storing instructions to perform {B} but not {A, C}, and a third device can comprise third memory storing instructions to perform {C} but not {A, B}. Likewise, if multiple processors of a system are configured to collectively perform a process, one processor can be configured to perform one step of the process while another processor is configured to perform another step of the process.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may be omitted from various discussions for the sake of clarity.

What is claimed is:

1. A computer-implemented method, comprising:

determining, by first one or more processors of a local host, a user;

performing, by the first one or more processors of the local host, a strong authentication with a cloud-based identity provider to establish an identity of the user;

obtaining, by the first one or more processors of the local host, a digital certificate comprising a public key associated with the identity;

providing, by the first one or more processors of the local host, the digital certificate to a remote host;

establishing, by the first one or more processors of the local host and based at least in part on the public key, an encrypted inter-process communication (IPC) channel with the remote host;

obtaining, by second one or more processors of the remote host, a command from the local host to access one or more computing resources of a resource provider;

providing, by the second one or more processors of the remote host, a request for a short-term security token, the request comprising a remote attestation that is to be validated for compliance by the cloud-based identity provider;

obtaining, by the first one or more processors of the local host, the short-term security token from the cloud-based identity provider; and providing, by the first one or more processors of the local host and via the encrypted IPC channel, the short-term security token to the remote host; and providing, by the second one or more processors of the remote host, the short-term security token to the resource provider in order to gain access to the one or more computing resources.

2. The computer-implemented method of claim 1, further comprising:

obtaining, by the first one or more processors of the local host, a challenge from the cloud-based identity provider;

determining, by the first one or more processors of the local host, authentication information using a private key stored in a security module electronically coupled to the local host; and providing, by the first one or more processors of the local host, the authentication information to the cloud-based identity provider as a response to the challenge.

3. The computer-implemented method of claim 1, further comprising:

obtaining, by the second one or more processors of the remote host, a second command from the local host to access the one or more computing resources;

determining, by the second one or more processors of the remote host, whether the short-term security token is valid; and responsive to a determination that the short-term security token is valid, utilizing, by the second one or more processors of the remote host, the short-term security token to gain access to the one or more computing resources to execute the second command.

4. The computer-implemented method of claim 1, further comprising:

obtaining, by the first one or more processors of the local host, an approval request; and wherein the remote host is able to gain access to the one or more computing resources contingent upon the approval request being confirmed.

5. A system, comprising:

one or more processors; and memory storing executable instructions that, as a result of execution by the one or more processors, cause the system to:

perform an authentication process with a cloud-based identity provider to establish an identity of a user;

obtain a digital certificate comprising a public key associated with the identity;

provide the digital certificate to a computing entity;

establish a cryptographically protected communications session with the computing entity;

provide, to the computing entity, a command from the user to access one or more computing resources of a resource provider;

obtain, from the computing entity, a remote attestation;

determine, based at least in part on the remote attestation, that the computing entity is a trustworthy computing entity;

determine a security token that encodes sufficient permissions to access at least the one or more computing resources of the resource provider; and provide, via the cryptographically protected communications session, the security token to the computing entity.

6. The system of claim 5, wherein:

the executable instructions to establish the cryptographically protected communications session with the computing entity include instructions that, as a result of execution by the one or more processors, cause the system to:

submit, by a SSH (secure shell protocol) agent of the system, a remote procedure call (RPC) request to an RPC service associated with the computing entity; and establishing an SSH connection with the RPC service; and the executable instructions to provide the security token to the computing entity include instructions that, as a result of execution by the one or more processors, cause the system to submit, to the RPC service, a RPC message comprising the security token.

7. The system of claim 5, wherein the remote attestation is digitally signed by a certificate authority that is trusted by the system.

8. The system of claim 5, wherein the executable instructions include further instructions that, as a result of execution by the one or more processors, further cause the system to:

provide, to the computing entity, a second command from the user to access second one or more computing resources of a second resource provider;

submit, to the identity provider, a second request for a second security token that encodes sufficient permissions to access the second one or more computing resources of the second resource provider;

perform a multifactor authentication process with the identity provider;

obtain, from the identity provider, the second security token; and provide, via the cryptographically protected communications session, the second security token to the computing entity.

9. The system of claim 5, wherein security token is a timebound JSON web token (JWT).

10. The system of claim 5, wherein the authentication process comprises a passwordless authentication of the user.

11. The system of claim 5, wherein the executable instructions include further instructions that, as a result of execution by the one or more processors, further cause the system to:

submit, to an identity provider, a validation request comprising the remote attestation; and receive, from the identity provider and in response to the validation request, a compliance status of the computing entity.

12. The system of claim 5, wherein the executable instructions include further instructions that, as a result of execution by the one or more processors, further cause the system to:

obtain, from the cloud-based identity provider, an approval request indicating that the computing entity is attempting to access the one or more computing resources; and provide, to the cloud-based identity provider, an approval to allow the computing entity to gain access to the one or more computing resources.

13. A non-transitory computer-readable storage medium storing executable instructions that, as a result of being executed by one or more processors of a computer system, cause the computer system to at least:

obtain, from a local device of a user, a digital certificate comprising a public key associated with an identity of the user;

establish a cryptographically protected communications session with the local device;

obtain a command from the user to access one or more computing resources of a resource provider;

determine that the computer system lacks sufficient security token to access the one or more computing resources of the resource provider;

provide a remote attestation of the computer system to the local device;

obtain, via the cryptographically protected communications session, a security token that encodes sufficient permissions to access at least the one or more computing resources of the resource provider; and provide the security token to the resource provider in order to gain access to the one or more computing resources of the resource provider.

14. The non-transitory computer-readable storage medium of claim 13, wherein the computer system is a virtual machine.

15. The non-transitory computer-readable storage medium of claim 13, wherein the remote attestation comprises a hardware or software configuration of the computer system and is cryptographically verifiable using a public key issued by an entity that the local host trusts.

16. The non-transitory computer-readable storage medium of claim 13, wherein the cryptographically protected communications session comprises a SSH tunnel.

17. The non-transitory computer-readable storage medium of claim 13, wherein the instructions, as a result of being executed by the one or more processors of the computer system, further cause the computer system to:

obtain a second command from the user to access the one or more computing resources;

determine that the security token is valid; and utilize the security token for execution of the second command.

18. The non-transitory computer-readable storage medium of claim 13, wherein the instructions, as a result of being executed by the one or more processors of the computer system, further cause the computer system to:

obtain a second command from the user to access the one or more computing resources;

determine that the security token has expired; and transmit, via the cryptographically protected communications session, a request to the device for access to the one or more computing resources obtain, via the cryptographically protected communications session, a second security token that encodes sufficient permissions to access the one or more computing resources; and provide the second security token to the resource provider to gain access to the one or more computing resources.

19. The non-transitory computer-readable storage medium of claim 13, wherein security token is a timebound JSON web token (JWT).

20. The non-transitory computer-readable storage medium of claim 13, wherein the user lacks physical access to the computer system.

* * * * *